United States Patent [19]

Kim

[11] Patent Number: 5,822,443

[45] Date of Patent: Oct. 13, 1998

[54] SPEAKER SYSTEM FOR A TELEVISION

[75] Inventor: Jae-Nam Kim, Kyungki-do, Rep. of Korea

[73] Assignee: Samsung Electronics Co., Ltd., Kyungki-do, Rep. of Korea

[21] Appl. No.: 736,945

[22] Filed: Oct. 25, 1996

[30] Foreign Application Priority Data

Apr. 22, 1996 [KR] Rep. of Korea ............ 96-12220
Apr. 22, 1996 [KR] Rep. of Korea ............ 96-12221

[51] Int. Cl.$^6$ .......................................... H04R 25/00
[52] U.S. Cl. ........................ 381/388; 381/341; 181/152
[58] Field of Search ................................ 381/159, 160, 381/156, 205; 181/152, 155, 159

[56] References Cited

U.S. PATENT DOCUMENTS 5,361,380  11/1994  You et al. ............... 381/24
5,524,062   6/1996  Oh ........................ 381/159
5,604,337   2/1997  Sugimoto et al. .......... 181/152
5,675,131  10/1997  Saito et al. ............. 181/152

FOREIGN PATENT DOCUMENTS 3-24900  2/1991  Japan ....................... 381/24

*Primary Examiner*—Sinh Tran
*Attorney, Agent, or Firm*—Sughrue, Mion, Zinn, Macpeak & Seas, PLLC

[57] ABSTRACT

A speaker system for a television includes a speaker provided in the television; a front amplifying member for amplifying sound waves radiated forward of the speaker; and a rear amplifying member for amplifying a portion of sound waves radiated rearward of the speaker. The rear amplifying member comprises a sound collecting part for collecting a portion of sound waves radiated rearward of the speaker, and a first and second amplifying horn halves detachably assembled each other to define an amplifying part of the rear amplifying member.

10 Claims, 5 Drawing Sheets

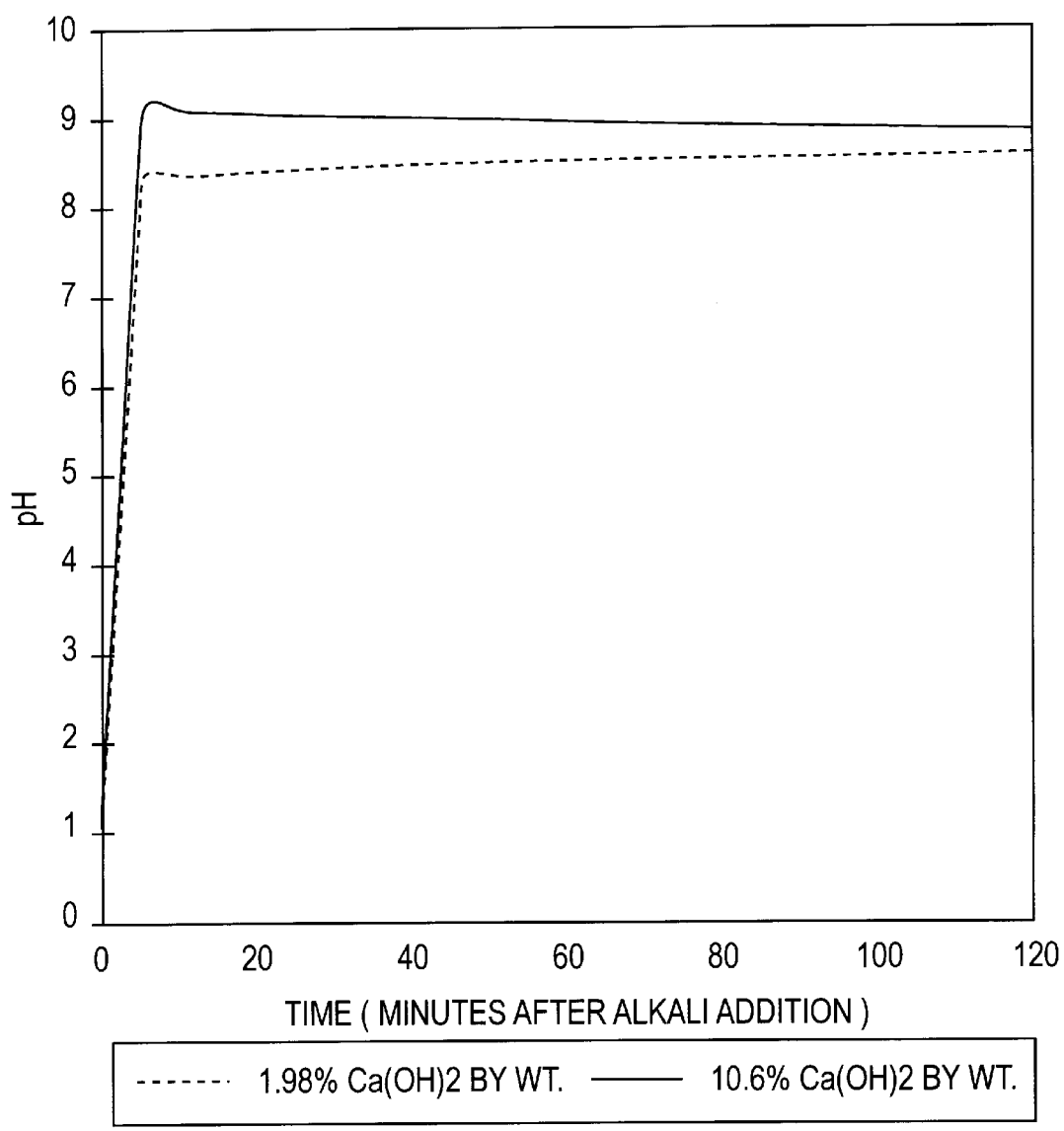

SPEAKER SYSTEM FOR A TELEVISION

BACKGROUND OF THE INVENTION

1. Field of the Invention

The present invention relates to a speaker system for a television, and more particularly to a speaker system for a television, in which sound waves in a low band frequency radiated rearward of a television and middle and high band frequencies radiated forward of the television are all amplified to improve the clearness of the resulting sound and in which the generation of standing waves is minimized.

2. Description of the Related Art

Generally, a speaker converts an electric signal into a sound wave signal and radiates the sound wave signal into free space. A cone speaker is commonly used. In a cone speaker, if a strong cylindrical magnetic field is created in a magnet which is located between a center pole and a yoke, as current is applied to a voice coil which is disposed in the magnetic field, force is induced to vibrate a conical vibrating board made of paper, or the like, thereby radiating sound waves.

FIG. 1 illustrates a schematic view of a conventional speaker system for a television. The speaker system includes a pair of speakers 3 fixedly mounted to both sides of the rear portion of a cabinet 2 in which a cathode ray tube 1 is provided. A pair of sound wave guiding members 4 are disposed along respective inner surfaces of both side walls of the cabinet 1. Each sound wave guiding member 4 has a passage 4a through which sound waves radiated from the speaker 3 can be discharged to a front of the television.

In this conventional speaker system, since the sound waves radiated from the speaker 3 conflict with each other while moving forward along the passage 4a, substantial interference occurs between the sound waves and thus by amplification of a sufficient level can not be effected. Also, since only the sound waves which are radiated forward of the television are guided along the passage 4a, the clearness of the resulting sound deteriorates. Particularly, radiation of low band frequencies is so slight that realistic, high quality sound cannot be obtained.

SUMMARY OF THE INVENTION

Accordingly, the present invention is directed to solving the problems occurring in the prior art, and an object of the present invention is to provide a speaker system for a television, which collects and amplifies a portion of sound waves radiated rearward of a speaker as well as sound waves radiated forward of the speaker, to increase amplification efficiency of middle and high band frequencies and particularly of low band frequencies, to obtain a clear, high quality sound.

Another object of the present invention is to provide a speaker system for a television, which can minimize the generation of standing waves in sound waves radiated forward of a speaker.

According to one aspect of the present invention, there is provided a speaker system for a television, comprising: a speaker provided in the television; a front amplifying member for amplifying sound waves radiated forward of the speaker; and a rear amplifying member for amplifying a portion of sound waves radiated rearward of the speaker.

According to another aspect of the present invention, the front amplifying member includes an amplifying part formed therein for amplifying the sound waves radiated forward of the speaker.

According to another aspect of the present invention, the rear amplifying member includes a sound collecting part for collecting the portion of sound waves radiated rearward of the speaker, and first and second amplifying horn halves detachably assembled to each other to define an amplifying part.

According to another aspect of the present invention, the first or second amplifying horn halves are formed with a plurality of engaging holes and guide holes, and the other of the other of first or second amplifying horns is formed with a plurality of engaging projections and guide pins which are engaged and inserted into the plurality of engaging holes and guide holes, respectively.

According to another aspect of the present invention, a damping member is disposed between the speaker and the front amplifying member.

According to another aspect of the present invention, the front amplifying member includes a sound absorbing member for preventing the generation of standing waves.

According to still another aspect of the present invention, the sound absorbing member is attached between ribs projectively formed on inner surface of the front amplifying member.

The speaker system according to the present invention provides advantages in that since not only sound waves radiated forward of a speaker are amplified by a front amplifying member but also sound waves radiated rearward of the speaker are amplified by a rear amplifying member, bass sounds as well as middle and high band sounds are effectively amplified, to increase the listening range, to improve clarity of the sound, and to obtain high quality stereophonic sounds. Also, since an amplifying part of a rear amplifying member is manufactured in parts, the size of a mold required for forming the amplifying part can be decreased to reduce overall manufacturing costs. Also, since the sound waves radiated forward of the speaker are absorbed and filtered by a sound absorbing member, the generation of standing waves is minimized to obtain clear sound.

BRIEF DESCRIPTION OF THE DRAWINGS

The above objects, and other features and advantages of the present invention will become more apparent from the following detailed description taken in conjunction with the drawings, in which:

FIG. 2 is an exploded perspective view illustrating a speaker system for a television in accordance with a first embodiment of the present invention;

DETAILED DESCRIPTION OF PREFERRED EMBODIMENTS

Hereinafter, a speaker system for a television in accordance with the preferred embodiments of the present invention will be described in detail with reference to the drawings.

Figure 1:
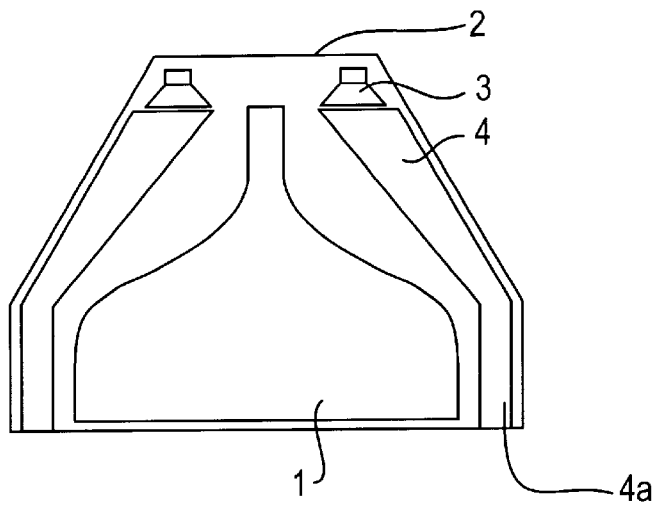
FIG. 1 is a schematic view illustrating a conventional speaker system for a television.
Figure 3:
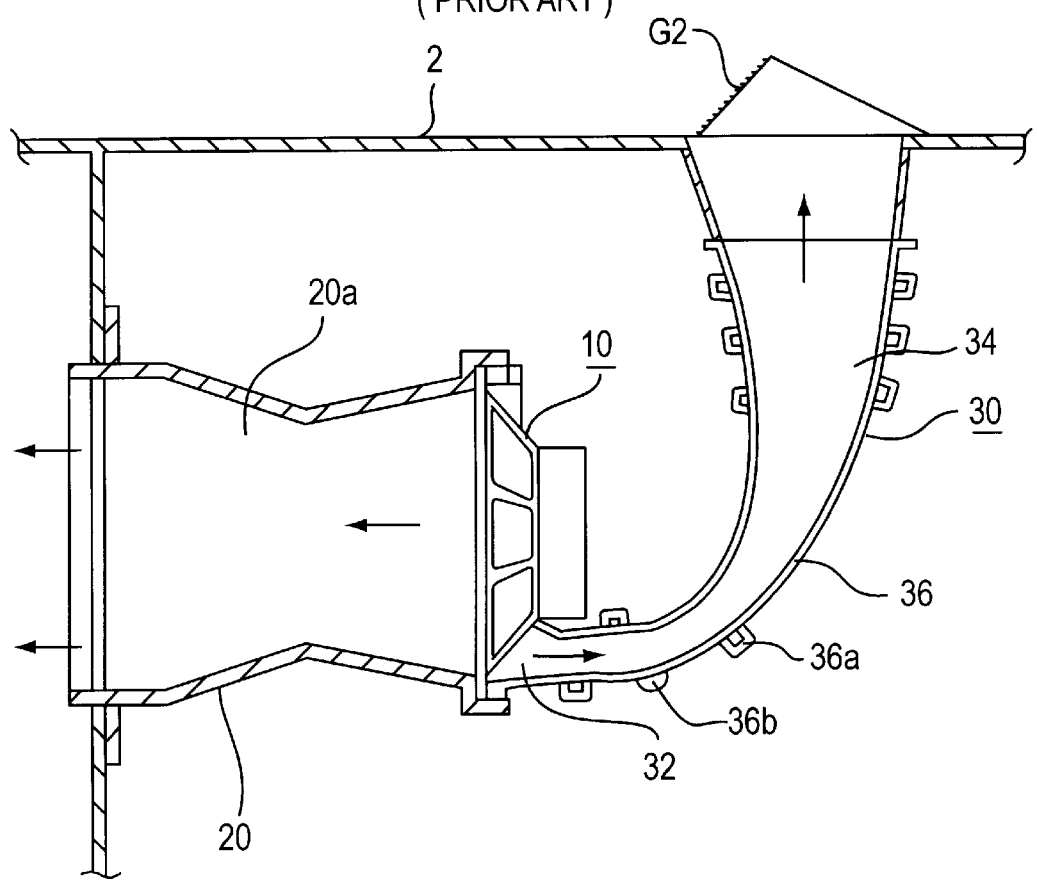
FIG. 3 is a cross-sectional view of the speaker system of FIG. 2.
Figure 4:
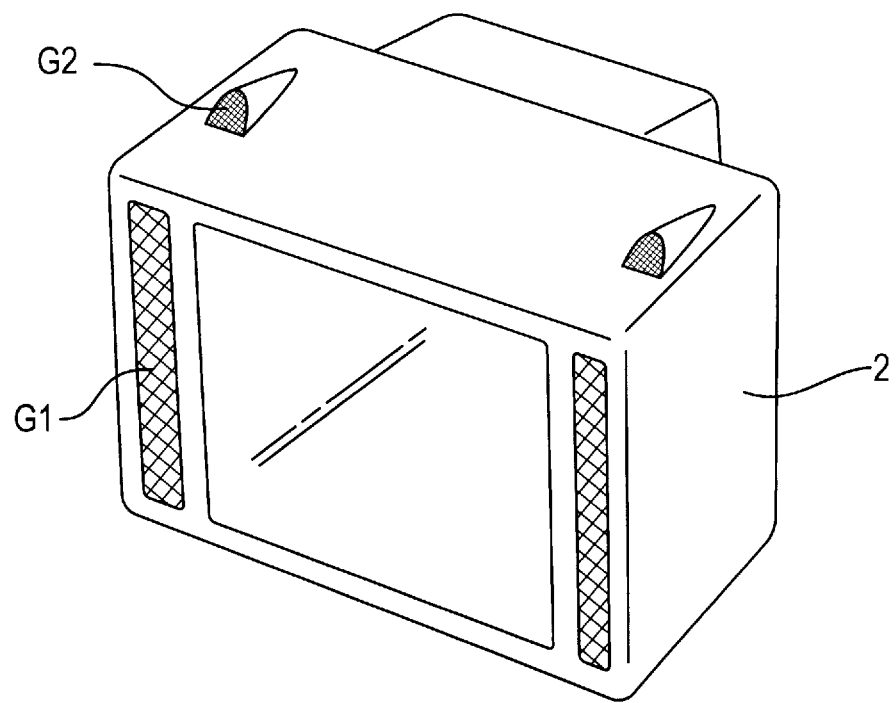
FIG. 4 is a schematic perspective view of a television in which the speaker system of FIG. 2 is mounted.

Referring to FIGS. 2 through 4, a speaker system for a television according to a first embodiment of the present invention includes a speaker 10, a front amplifying member 20 and a rear amplifying member 30. One end of the front amplifying member 20 is fastened to the front surface of the speaker 10, and an amplifying part 20a is defined in the front amplifying member 20 to amplify sound waves radiated forward of the speaker 10. One end of the rear amplifying member 30 is fastened to the rear surface of the speaker 10 to amplify sound waves radiated rearward of the speaker 10. The other end of the front amplifying member 20 is positioned in the front portion of a cabinet 2 to discharge the sound waves, particularly the sound waves having middle and high band frequencies, radiated forward of the speaker 10.

The rear amplifying member 30 includes a sound collecting part 32 which collects a portion of the sound waves radiated rearward of the speaker 10, and an amplifying horn or horn part, 34 which extends rearward from the sound collecting part 32 and has a gradually increasing diameter to amplify the sound waves collected by the sound collecting part 32. One end of the rear amplifying member 30 is formed with a flange 32a, and the flange 32a has an opening 32b through which sound waves not collected by the sound collecting part 32 can pass. The amplifying horn 34 is generally arc-shaped in section as best shown in FIG. 2, and has axially extending edges that define contact portions 36, respectively. A separate amplifying plate 38 or horn part, which has a shape corresponding to that of the amplifying horn 34, i.e., essentially a mirror image, is provided to define an amplifying part of the rear amplifying member 30, and axially extending edges of the separate amplifying plate 38 are contacted with the contact portion 36 of the amplifying horn 34. A discharging horn 40 is integrally formed in the other end of the amplifying horn 34 to discharge the amplified sound waves towards an upper portion of the cabinet 2. The front amplifying member 20, the speaker 10 and the rear amplifying member 30 are coupled to each other by a locking device, such as a bolt or the like.

A plurality of engaging holes 36a and a plurality of guide holes 36b are formed on the circumferential outer surface of the amplifying horn 34 close to the contact portion 36. On the axially extending edges of the amplifying plate 38 are formed a plurality of engaging projections 38a which are to be engaged in the engaging holes 36a, respectively, and a plurality of guide pins 38b which are to be inserted in the guide holes 36b, respectively. This engagement couples amplifying horn 34 and amplifying plate 38 to each other.

In the present embodiment of the present invention, even though the discharging horn 40 of the rear amplifying member 30 directs the amplified sound waves toward the upper portion of the cabinet 2, the discharging horn 40 can direct the amplified sound waves toward the side, lower or rear portions of the cabinet 2.

In the speaker system according to the first embodiment of the present invention, if a cone vibrates and generates sound waves by a strong cylindrical magnetic field created in the speaker 10, the sound waves are radiated not only forward but also rearward of the speaker 10. The sound waves radiated forward of the speaker 10 are introduced into the front amplifying member 20 and then are discharged at the front of the television. Particularly, middle and high band sounds which are generated from the front center portion of the speaker 10 are sufficiently amplified while passing through the front amplifying member 20. The middle and high band sounds are discharged through front grills G1 provided in the front surface of the television.

A portion of the sound waves radiated rearward of the speaker 10 is collected into the rear amplifying member 30, is sufficiently amplified, and then is discharged through upper grills G2 provided in the upper surface of the television. Specifically, a portion of the sound waves radiated rearward of the speaker 10, flows into the sound collecting part 32 formed on the one end of the rear amplifying member 30, and is amplified while passing through the amplifying horn 34 which has a gradually increasing diameter. The sound waves, particularly bass sound waves amplified in the amplifying horn 34 are discharged through the discharging horn 40.

Therefore, the middle and high band sounds are discharged through the front grills G1 provided in the front surface of the cabinet 2, and bass sounds are discharged through the upper grills G2 provided in the upper surface of the cabinet 2. This improves sound clarity.

Also, because the amplifying horn 34 has the contact portion 36 and the separate amplifying plate 38 is engaged to the amplifying horn 34, these parts can be separately manufactured to define the amplifying part of the rear amplifying member 30. The plurality of engaging projections 38a and guide pins 38b formed in the separate amplifying plate 38 are detachably engaged and inserted respectively into the plurality of engaging holes 36a and guide holes 36b formed in the amplifying horn 34. Therefore, assembling or disassembling operations can be performed in a convenient manner, and the size of a mold required to form discharging horn 40 can be decreased to reduce overall manufacturing costs.

Figure 5:
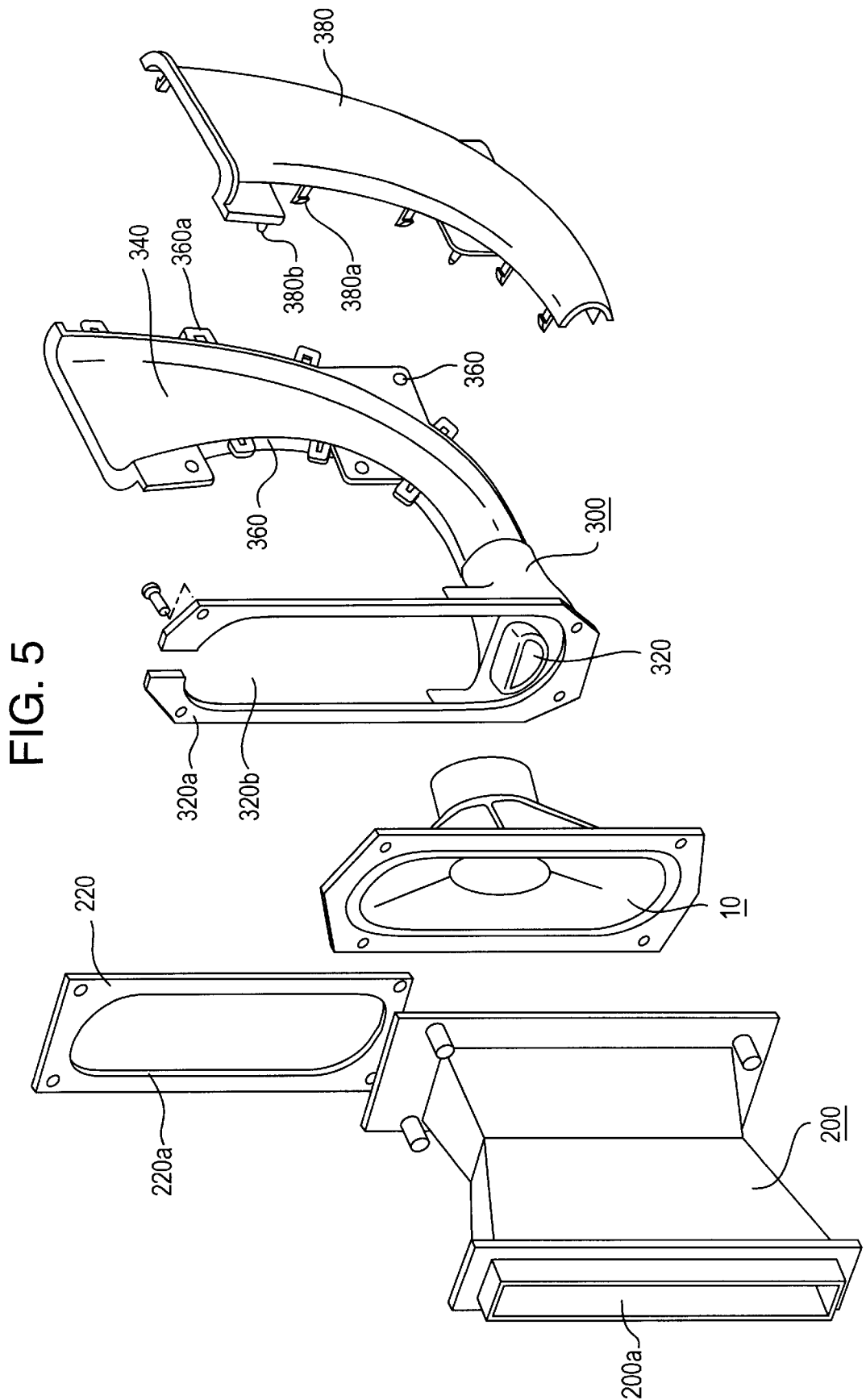
FIG. 5 is an exploded perspective view illustrating a speaker system for a television in accordance with a second embodiment of the present invention.
Figure 6:
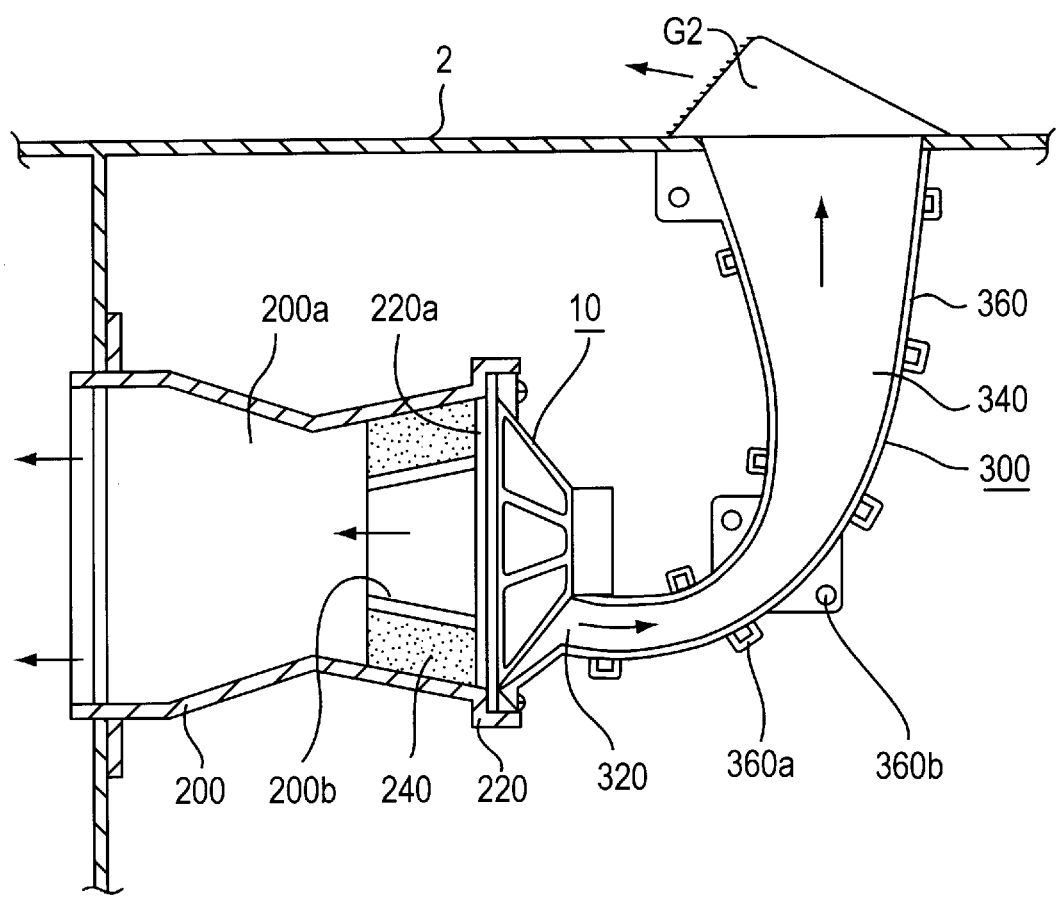
FIG. 6 is a cross-sectional view of the speaker system of FIG. 5.

Referring to FIGS. 5 and 6, a speaker system for a television according to a second embodiment of the present invention includes a speaker 10, a front amplifying member 200 and a rear amplifying member 300. One end of the front amplifying member 200 is fastened to the front surface of the speaker 10, and an amplifying part 200a is defined in the front amplifying member 200 to amplify sound waves radiated forward of the speaker 10. One end of the rear amplifying member 300 is fastened to the rear surface of the speaker 10 to amplify a portion of the sound waves radiated rearward of the speaker 10. The front amplifying member 200 extends to the front of the cabinet 2 which defines a contour of the television, to discharge the sound waves having middle and high band frequencies that are radiated forward of the speaker 10. A cushioning member 220 is disposed between the front amplifying member 200 and the speaker 10. The cushioning member 220 has a through hole 220a. In this embodiment of the present invention, it is preferable that the through hole 220a has the same size as the speaker cone.

On the inner surface of the front amplifying member 200, adjacent to the rear end thereof, are a pair of sound absorbing members 240 for preventing standing waves from being generated by sound waves radiated forward of the speaker 10 which flow back to the speaker 10 to adversely affect the cone. Also, the sound absorbing members 240 filters any bass sound included in the sound radiated from the front of the speaker 10. The sound absorbing member 240 is arranged between ribs 200b which project from the inner surface of the front amplifying member 200, and is made of fiberglass, felt, or any other absorbent material When forming the sound absorbing member 240, fiberglass strands having a very small diameter are deposited in thermosetting resins such as phenol, or the like. Also, because felt has a large mass, absorbs little of the middle and high band sounds and provides a proper damping force for the bass sounds, it can prevent the front and rear amplifying members 200 and 300 from being vibrated due to the sound waves and thus is suitable for sound absorbing member 240.

The rear amplifying member 300 includes a sound collecting part 320 which collects a portion of sound waves radiated rearward of the speaker 10, and an amplifying horn 340 which extends rearward from the sound collecting part 320 and has a gradually increasing diameter to amplify the sound waves collected by the sound collecting part 320. One end of the rear amplifying member 300 is formed with a flange 320a, and the flange 320a has an opening 320b through which rearward radiated sound waves not collected by the sound collecting part 320 can pass. The amplifying horn 340 has generally a arc-shaped section, and has axially extending edges that define a contact portion 360. A separate amplifying plate 380 which has a shape corresponding to that of the amplifying horn 340 is provided to define an amplifying part of the rear amplifying member 300, and axially extending edges of the separate amplifying plate 380 are placed in contact with the contact portion 360 of the amplifying horn 340.

The front amplifying member 200, the cushioning member 220, the speaker 10 and the rear amplifying member 300 are combined to each other by locking means such as a bolt, or the like.

A plurality of engaging holes 360a and a plurality of guide holes 360b are formed on the circumferential outer surface of the amplifying horn 340 close to the contact portion 360. A plurality of engaging projections 380a, which are to be engaged into the engaging holes 360a, respectively, and a plurality of guide pins 380b which are to be inserted into the guide holes 360b, respectively, are formed on the axially extending edges of the amplifying member 380.

In this embodiment of the present invention, even though the rear end of the rear amplifying member 300 is positioned to direct the amplified sound waves toward an upper portion of the cabinet 2, it can be formed to discharge the amplified sound waves toward side, lower or rear portions of the cabinet 2.

In the speaker system according to this embodiment, if a cone vibrates and generates sound waves by a strong cylindrical magnetic field created in the speaker 10, these sound waves are radiated not only forward but also rearward of the speaker 10. The sound waves radiated forward of the speaker 10 are introduced into the front amplifying member 200 through the through hole 220a and then are discharged at the front of the television. Particularly, middle and high band sounds which are generated from the front center portion of the speaker 10 are sufficiently amplified while passing through the front amplifying member 200. Accordingly, the middle and high band sounds amplified are discharged through front grills provided in the front surface of the television.

In addition, since a portion of the sound waves introduced into the amplifying part 200a of the front amplifying member 200 is absorbed by the sound absorbing member 240 for preventing standing waves from being generated in the sound waves radiated forward of the speaker 10 and for filtering any bass sound included therein, the sound waves radiated forward of the speaker 10 will not deteriorate in clarity. Further, because the cushioning member 220 is disposed between the front amplifying member 200 and the speaker 10, shock from the vibration of the speaker 10 can be reduced.

A portion of the sound waves which are radiated rearward of the speaker 10, is collected into the rear amplifying member 300, is sufficiently amplified, and then is discharged through upper grills G2 provided in the upper surface of the television. Specifically, a portion of the sound waves radiated from the back of the speaker 10, flows into the sound collecting part 320 formed on the one end of the rear amplifying member 300, and is amplified while passing through the amplifying horn 340 to effectively amplify the bass sound.

Because the amplifying horn 340 has the contact portion 360 and the separate amplifying plate 380, which is engaged with the amplifying horn 340, are separately manufactured to define the amplifying part of the rear amplifying member 300, the size of the mold for producing the amplifying member 300 can be decreased to reduce overall manufacturing costs. Also, because the plurality of engaging projections 380a and guide pins 380b are formed in the separate amplifying plate 380 and are detachably engaged and inserted respectively into the plurality of engaging holes 360a and guide holes 360b which are formed in the amplifying horn 340, assembling/disassembling operations can be performed in a convenient manner.

As a result, the speaker system according to the present invention provides advantages in that sound waves radiated forward of a speaker are amplified by a front amplifying member and sound waves radiated rearward of the speaker are amplified by a rear amplifying member. Accordingly, bass sounds as well as middle and high band sounds are effectively amplified, to increase the projected distance and clarity of sound and to obtain high quality stereophonic sounds. Finally, because the sound waves radiated forward of the speaker are filtered by a sound absorbing member, generation of standing waves is minimized to obtain clear sound. Also, the invention can be applied to devices other than televisions, such as computer monitors, or the like.

While preferred embodiments of the invention have been disclosed, modifications can be made without departing from the scope of the invention as set forth in the following claims.

What is claimed is:

1. A speaker system for a television housed within a cabinet, comprising:
   a speaker provided in the television;
   a front amplifying member for amplifying sound waves radiated from a front of said speaker; and
   a rear amplifying member for amplifying a portion of sound waves radiated from a back of said speaker,
   wherein said rear amplifying member is arc-shaped and has a first end attached to a rear portion of said speaker and a second end open to an outlet in the cabinet, wherein said front amplifying member includes an amplifying part formed therein for amplifying the sound waves radiated from the front of said speaker and said front amplifying member has a first end attached to a front face of said speaker and a second end, wherein said amplifying part has an increasing cross-sectional area opening towards said second end.

2. A speaker system as claimed in claim 1, wherein a damping member is disposed between said speaker and said front amplifying member.

3. A speaker system as claimed in claim 1, wherein said front amplifying member includes a sound absorbing member for preventing generation of standing waves.

4. A speaker system as claimed in claim 3, wherein said sound absorbing member is attached between ribs formed on an inner surface of said front amplifying member.

5. A speaker system as claimed in claim 1 wherein said rear amplifying member has a diameter that continuously increases as it extends away from said speaker.

6. A speaker system as claimed in claim 1, wherein said front amplifying member directs sound waves to a front face of the cabinet and said rear amplifying member directs sound waves to a top face of the cabinet, so that the sound waves of said front and rear amplifying member are discharged through separate outlets of the cabinet.

7. A speaker system for a television housed within a cabinet, comprising:

a speaker provided in the television;

a front amplifying member for amplifying sound waves radiated from a front of said speaker; and a rear amplifying member for amplifying a portion of sound waves radiated from a back of said speaker, wherein said rear amplifying member is arc-shaped and has a first end attached to a rear portion of said speaker and a second end open to an outlet in the cabinet, wherein said first end of said rear amplifying member includes a sound collecting part for collecting the portion of sound waves radiated from the back of said speaker, and first and second amplifying horn halves detachably assembled to each other to define an amplifying part of said rear amplifying member, said first and second amplifying horn halves having axially extending edges, wherein said second amplifying horn half has a shape corresponding to said first amplifying horn half so that said axially extending edges of said first and second amplifying horn halves contact.

8. A speaker system as claimed in claim 7, wherein one of said first and second amplifying horn halves is formed with a plurality of engaging holes and guide holes, and the other of said first and second amplifying horn halves is formed with a plurality of engaging projections and guide pins which are engaged and inserted into said plurality of engaging holes and guide holes, respectively.

9. A speaker system as claimed in claim 4, wherein said second end of said rear amplifying member has a discharging horn disposed therein, integrally formed to one end of said first and second amplifying horn halves assembled together, to discharge the sound waves out through the outlet in the cabinet.

10. A speaker system as claimed in claim 4, wherein said rear amplifying member further has a flange having an opening, for covering the rear of said speaker, wherein said opening of said amplifying member collects any sound waves not collected by said sound collecting part.

* * * * *

UNITED STATES PATENT AND TRADEMARK OFFICE
CERTIFICATE OF CORRECTION

PATENT NO.   : 5,822,443
DATED        : October 13, 1998
INVENTOR(S)  : Jae-Nam KIM It is certified that error appears in the above-identified patent and that said Letters Patent is hereby corrected as shown below:

Delete "PRIOR ART" from Fig. 3.

Signed and Sealed this

Thirtieth Day of March, 1999

Attest:

Q. TODD DICKINSON

*Attesting Officer*   Acting Commissioner of Patents and Trademarks